Patented May 18, 1943

2,319,630

UNITED STATES PATENT OFFICE 2,319,630

DEODORIZED SULPHUR-BEARING COMPOSITION

Carl F. Prutton, Cleveland Heights, and Harry E. Johnson, Willoughby, Ohio, assignors to The Lubri-Zol Corporation, Wickliffe, Ohio, a corporation of Ohio No Drawing. Application December 28, 1939, Serial No. 311,420

2 Claims. (Cl. 252—46)

This invention relates as indicated to the problem of deodorizing compositions of matter which contain sulphur and, more specifically, to such compositions wherein objectionable gases such as hydrogen sulphide are generated on standing or in use and thus render the composition undesirable because of its noxious odor.

This application is a continuation in part of our co-pending application Serial No. 107,909, filed October 27, 1936.

More particularly, this invention pertains to the problem of deodorizing oily substances such as cutting fluids and lubricating compositions which contain sulphur in such form that objectionable odors due to the presence of the sulphur are generated and emitted during storage or use. In addition to the evolution of hydrogen sulphide, other materials of even more objectionable odor may be formed; for example, mercaptans and related compounds, which, because of their lower volatility, are even more difficult to remove from the composition.

It is a principal object of this invention, therefore, to provide a means whereby sulphur-containing compounds, which previously have emitted such noxious odors as to render the same objectionable for use, are rendered substantially inoffensive.

Other objects of the invention will appear as the description proceeds.

To the accomplishment of the foregoing and related ends, said invention, then, consists of the means hereinafter fully described, and particularly pointed out in the claims, the following description setting forth in detail one approved combination of ingredients embodying our invention, such disclosed means constituting, however, but one of various forms in which the principle of the invention may be used.

This invention may be broadly stated as comprising the discovery that offensively odorous sulphur-bearing compounds may be rendered unobjectionable by reaction with an aldehyde.

The type of sulphur-bearing composition above referred to may consist of a composition resulting from heating together sulphur and animal, vegetable, or mineral oils, or of incorporating in oils of mineral or non-mineral origin sulphur compounds produced by treating various organic compounds, for example terpenes, with sulphur or inorganic sulphur compounds such as sulphides and poly-sulphides at ordinary or elevated temperatures.

In the preparation of substantially pure sulphur compounds or on the storage of such sulphur compounds, by-products which have the noxious odor above referred to may also be formed. These noxious materials may be rendered substantially inoffensive by incorporating small amounts of aldehydes in the composition and inducing their reaction with the offensive compounds.

Generally, reaction between the aldehyde and the offensively odoriferous sulphur compounds is promoted by heating, for example to 100° C., and continuing such heating for one-half to one hour, for example. The temperature maintained may preferably range from about 70° C. to about 125° C., and the higher such temperature is, the less time will be required to complete the reaction.

The aldehydes generally have been found to be effective for the purpose stated and are preferably those of higher molecular weight than acetaldehyde, for example, butaldehyde, and are also preferably of the aromatic type, for example, benzaldehyde. Furfural is also effective.

The concentration in which the aldehyde is to be added to the composition depends upon the amount of noxious materials contained therein and range from less than one hundredth of one per cent to more than five-tenths of one per cent.

An important field of use for the present invention is in making commercially feasible the use of certain sulphur-bearing compounds in various compositions such as lubricating compositions. These compounds contain or tend to form traces of most evil smelling compounds such as mercaptans. By the reaction of a small amount of an aldehyde therewith high molecular weight pleasant-smelling or odorless compounds called mercaptals are formed. Generally, the condensation products obtained have sufficiently high molecular weights to be substantially non-volatile.

For most commercial compositions of the type produced, for example, by heating sulphur with a vegetable or animal oil, the amount of aldehyde, such as benzaldehyde, required is of the order of two to five parts in 10,000.

Smaller amounts of the aldehyde will be required if the composition is subjected to a preliminary step which will remove the more volatile noxious constituents. Such step may consist, for example, in blowing with air or other inert gas or exposing to a vacuum, the effectiveness of both of the foregoing processes being stimulated by elevating the temperature of the material.

The aldehyde may be incorporated in the composition by any of the usual means, such incorporation being facilitated by elevation of temperature. Often, the aldehyde may be added immediately after the preparation of the sulphur-bearing composition, taking advantage of the elevated temperature usually prevailing at such time to promote the reaction. The beneficial effect is improved by the thoroughness of the mixing operation and is considerably enhanced by passing the final composition through a homogenizing device such as that described in Cornell Patent No. 2,042,880.

Other modes of applying the principle of our invention may be employed instead of the one explained, change being made as regards the materials employed in carrying out the process, provided the ingredient or ingredients stated in any of the following claims or the equivalent of such stated ingredient or ingredients be employed.

We, therefore, particularly point out and distinctly claim as our invention:

1. The method of improving a lubricating composition containing a characterizing amount of a sulphur-bearing compound containing odorous organic constituents which comprises adding to such composition a small amount of an aldehyde whereby the latter reacts with and renders inoffensive such odorous sulphur-bearing constituents as may be originally present and produced during storage and use.

2. The method of improving a lubricating composition containing a characterizing amount of a sulphur-bearing compound containing odorous organic constituents which comprises adding to such composition from about one part in ten thousand to fifty parts in ten thousand, based on the total composition, of benzaldehyde, whereby such odorous sulphur-bearing constituents, as may be originally present and formed during storage and use, are reacted with and rendered inoffensive.

CARL F. PRUTTON.
HARRY E. JOHNSON.